United States Patent [19]

Henits et al.

[11] Patent Number: 5,396,371
[45] Date of Patent: Mar. 7, 1995

[54] ENDLESS LOOP VOICE DATA STORAGE AND RETRIEVABLE APPARATUS AND METHOD THEREOF

[75] Inventors: John Henits, Bethel; Robert B. Swick, Stratford; Constantine P. Messologitis, Milford; Christopher S. Goane, Greenwich, all of Conn.

[73] Assignee: Dictaphone Corporation, Stratford, Conn.

[21] Appl. No.: 171,296

[22] Filed: Dec. 21, 1993

[51] Int. Cl.6 ............................ G11B 5/00; G11B 5/09
[52] U.S. Cl. ............................................. 360/5; 360/32
[58] Field of Search ................ 379/89, 45, 88, 53; 360/46, 51, 5, 32, 33.1

[56] References Cited

U.S. PATENT DOCUMENTS

| | | | |
|---|---|---|---|
| 4,663,779 | 5/1987 | Szeto | 379/88 X |
| 4,811,376 | 3/1989 | Davis et al. | 379/88 X |
| 4,891,835 | 1/1990 | Leung et al. | 379/45 X |
| 5,034,975 | 7/1991 | Grimes | 379/89 X |
| 5,065,428 | 11/1992 | Mitchell et al. | 379/89 X |
| 5,163,085 | 11/1992 | Sweet et al. | 379/89 |
| 5,179,479 | 1/1993 | Ahn . | |
| 5,195,128 | 3/1993 | Kinl | 379/89 X |
| 5,199,062 | 3/1993 | Van Meister et al. | 379/89 X |
| 5,235,475 | 8/1993 | Tokumatsu et al. . | |
| 5,283,818 | 2/1994 | Klausner et al. | 379/88 X |
| 5,339,203 | 8/1994 | Henits et al. | 360/39 |

FOREIGN PATENT DOCUMENTS 13260001  3/1970  United Kingdom .................... 360/5

Primary Examiner—Donald Hajec
Assistant Examiner—Thien Minh Le
Attorney, Agent, or Firm—Ronald Reichman; Melvin J. Scolnick

[57] ABSTRACT

Apparatus and method for storing and retrieving audio data simultaneously. A digital audio logger is provided with a digital audio tape (DAT) for permanent storage of audio data and with a random access storage (RAS) device that provides fast retrieval of audio. Both the DAT and RAS devices have audio written from a buffer that initially stores audio data temporarily. Two pointers are provided for the RAS device. Because of the randomness characteristic of the RAS device, data can be retrieved rapidly with a first one of the pointers and for this reason has advantages in fast retrieval. The RAS device communicates with a supervisor whereby data can be retrieved therefrom through the first pointer while the RAS device is receiving data from the buffer through the second pointer.

8 Claims, 4 Drawing Sheets

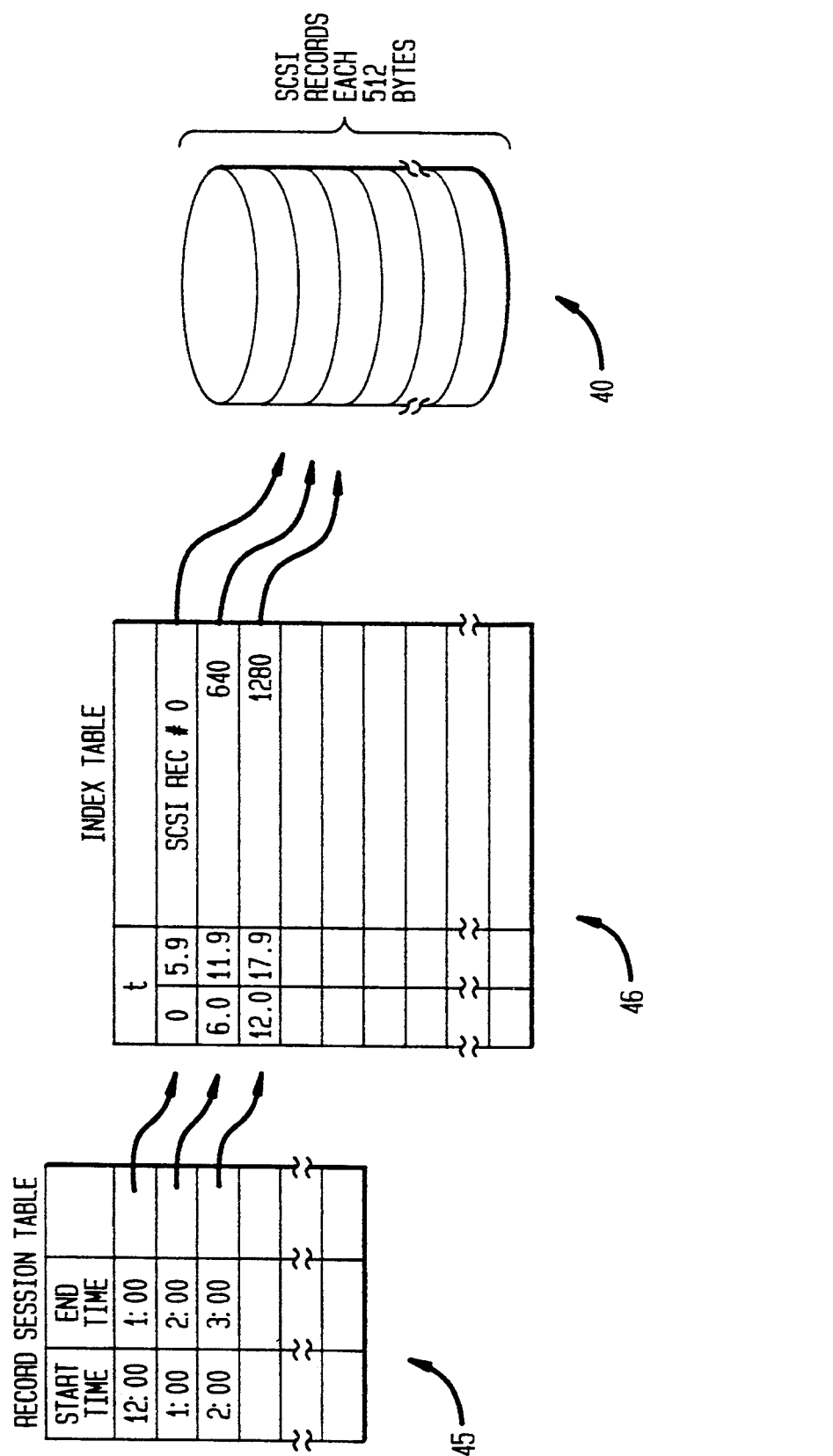

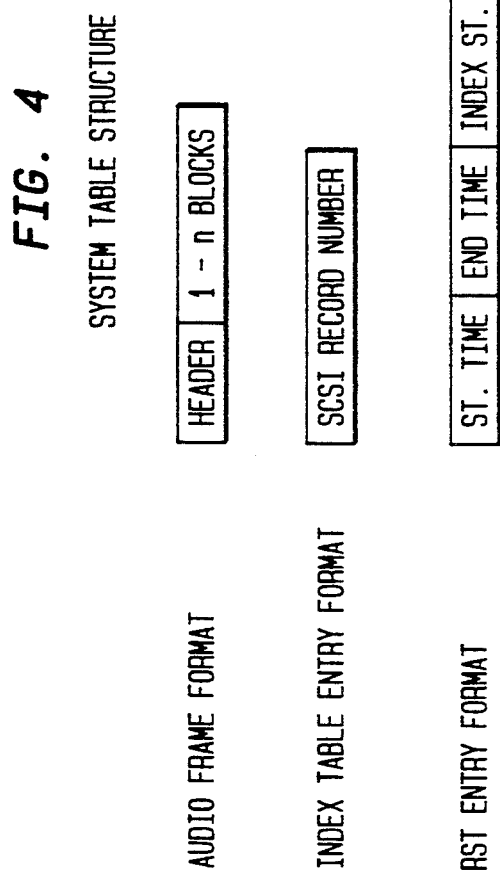

ENDLESS LOOP VOICE DATA STORAGE AND RETRIEVABLE APPARATUS AND METHOD THEREOF

BACKGROUND OF THE INVENTION

Audio loggers are well known devices that are used for the purpose of obtaining records of voice communication by recording audio on a tape. They have particular use in police stations, hospitals, prisons, brokerage houses and other locations where there is a need to record a conversation or other audio and the time and date thereof. Upon completion of recording, the tapes upon which audio is written are stored for archival purposes. The tapes can be either digital tapes or analog tapes, depending upon whether a digital audio logger or analog audio logger is used.

One requirement for a logger is that there be an ability to have audio retrieved even though a tape is still having audio written thereon. Clearly, if a tape had to be repositioned in order to obtain audio, there would be an interruption and data would be lost. In order to avoid such an occurrence, prior loggers have provided redundant tapes. One tape would act as a primary tape that receives data on a continuous basis while the second tape receives the same data simultaneously, except that the second tape could be removed when audio had to be retrieved. Upon removal of the secondary tape, another secondary tape would be installed in the logger and the redundancy is continued.

Although the redundancy scheme provides a way for obtaining data without interrupting recording, there clearly are disadvantages. One disadvantage is that an audio tape is a slow responding medium and searching for information on a tape is time consuming. This is a disadvantage during the time of emergencies. Another disadvantage is that a lapse in written data could occur during exchange of the secondary tapes. Clearly, it would be advantageous to be able to have continuous recording of audio without the disadvantages of using redundant tapes.

SUMMARY OF THE INVENTION

Apparatus and method have been devised wherein information can be retrieved from a digital audio logger as the logger continues to receive audio. The audio logger is provided with a buffer that receives audio in real time and temporarily stores the same in the buffer. A digital audio tape (DAT) and a random access storage (RAS) device are in communication with the buffer to simultaneously receive data when the buffer down loads data. This occurs after the buffer has stored a prescribed amount of data.

A supervisor is in communication with the logger, and a data retrieving pointer is connected to the RAS device so that data can be retrieved from the RAS device while data is also being written thereto by a second pointer. The data retrieving pointer first goes to the header of the RAS device for determining the location of data stored at a particular time. After the printer reads the location of data from the header, it will then contact the location at which the desired information is written. The recording will be played back so that the sought after information can be retrieved. As such retrieving is taking place, the second pointer allows the RAS device to continuously receive data at the same time as the DAT.

BRIEF DESCRIPTION OF THE DRAWING

FIG. 3 is a schematic representation of the manner in which data is retrieved from the RAS device illustrated in FIG. 2; and FIG. 4 is a system table structure that describes the format for the data.

DETAILED DESCRIPTION OF THE PREFERRED EMBODIMENT

Figure 1:
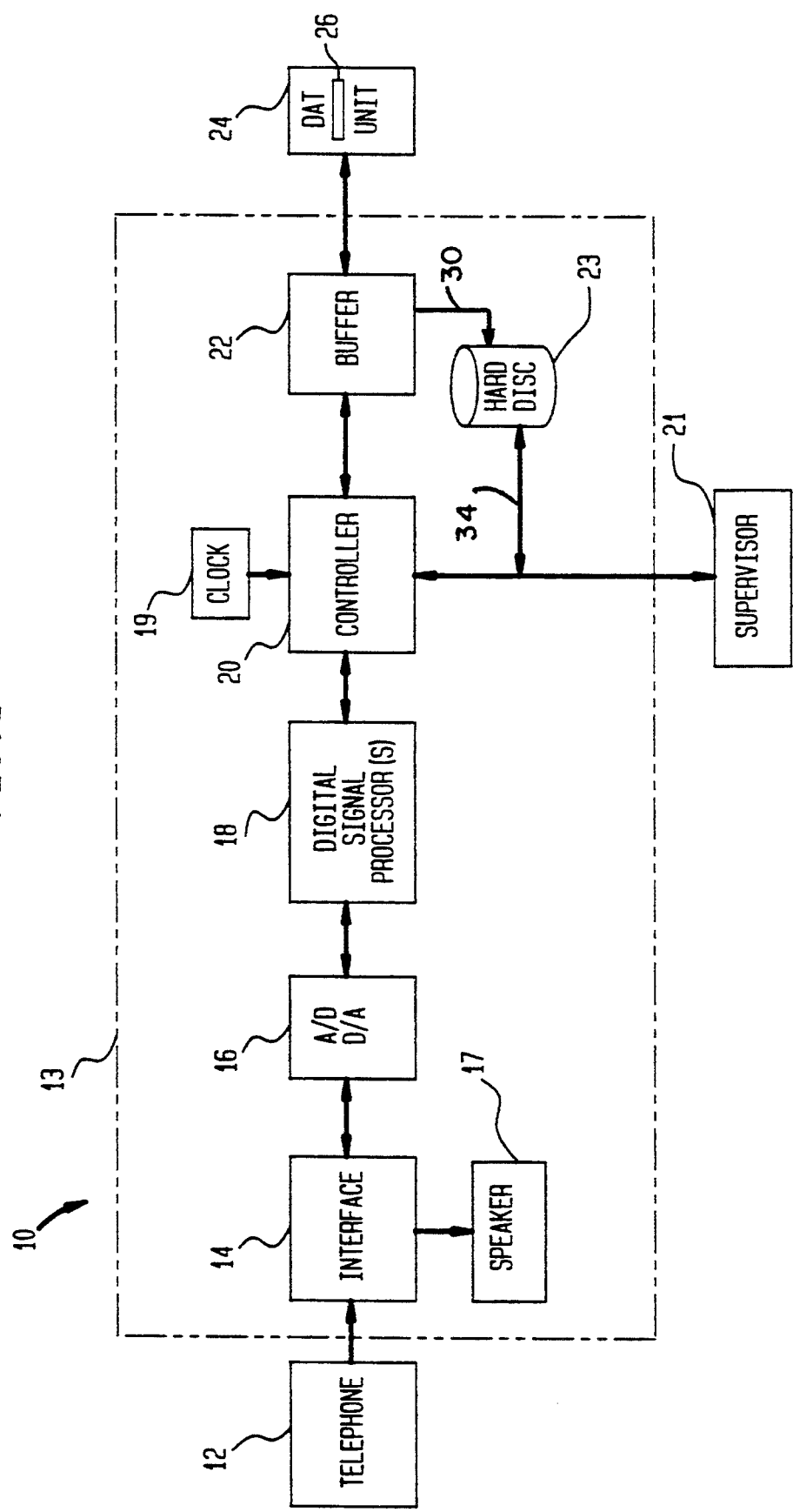
FIG. 1 is a block diagram illustrating a digital audio logger system in which the instant invention can be practiced.

With reference to FIG. 1, a digital audio logger system is shown generally at 10, in which the instant invention can be practiced. A plurality of audio sources 12, such as telephones, are able to transmit audio to an interface 14 of a digital logger 13 which monitors the telephones. Although the invention will be described with the use of telephones 12, it will be appreciated the invention can be used with other sources of audio, such as police radios. The interface 14 is in communication with a speaker 17 and with an analog/digital (A/D), digital/analog (D/A) converter 16 that will convert analog signals received from the telephones 12 to digital signals when data is flowing in one direction and digital to analog signals when data flows in the opposite direction. A digital signal processor 18 is in communication with the converter 16 and performs the function of compressing the digital voice signals by use of a voice compressing algorithm as is known in the art. Any of a number of commercially commercially available signal processors can be used for the purpose, such as a Texas Instrument TMS 320C25 processor available from Texas Instruments Inc. The compressed data is received by a controller 20 that arranges the data in a prescribed order and controls the flow of the data. In with the controller 20, is a clock 19 that provides the time and data, a buffer 22 that temporarily stores data, a random access storage device 23 and a supervisor 21 that provides access to the logger 13.

The buffer 22 is a memory that communicates with a digital audio tape (DAT) drive 24 and a random access storage (RAS) device 23. The DAT drive 24 is adapted to receive a DAT tape 26. A pointer 30 provides communication from the buffer 22 to the RAS device for the purpose of transferring data to the RAS device that is temporarily stored in the buffer. A second pointer 34 is also in communication with the RAS device 23 and is under control of the controller 20 in response to input from the supervisor 21 as will be explained hereinafter.

Figure 2:
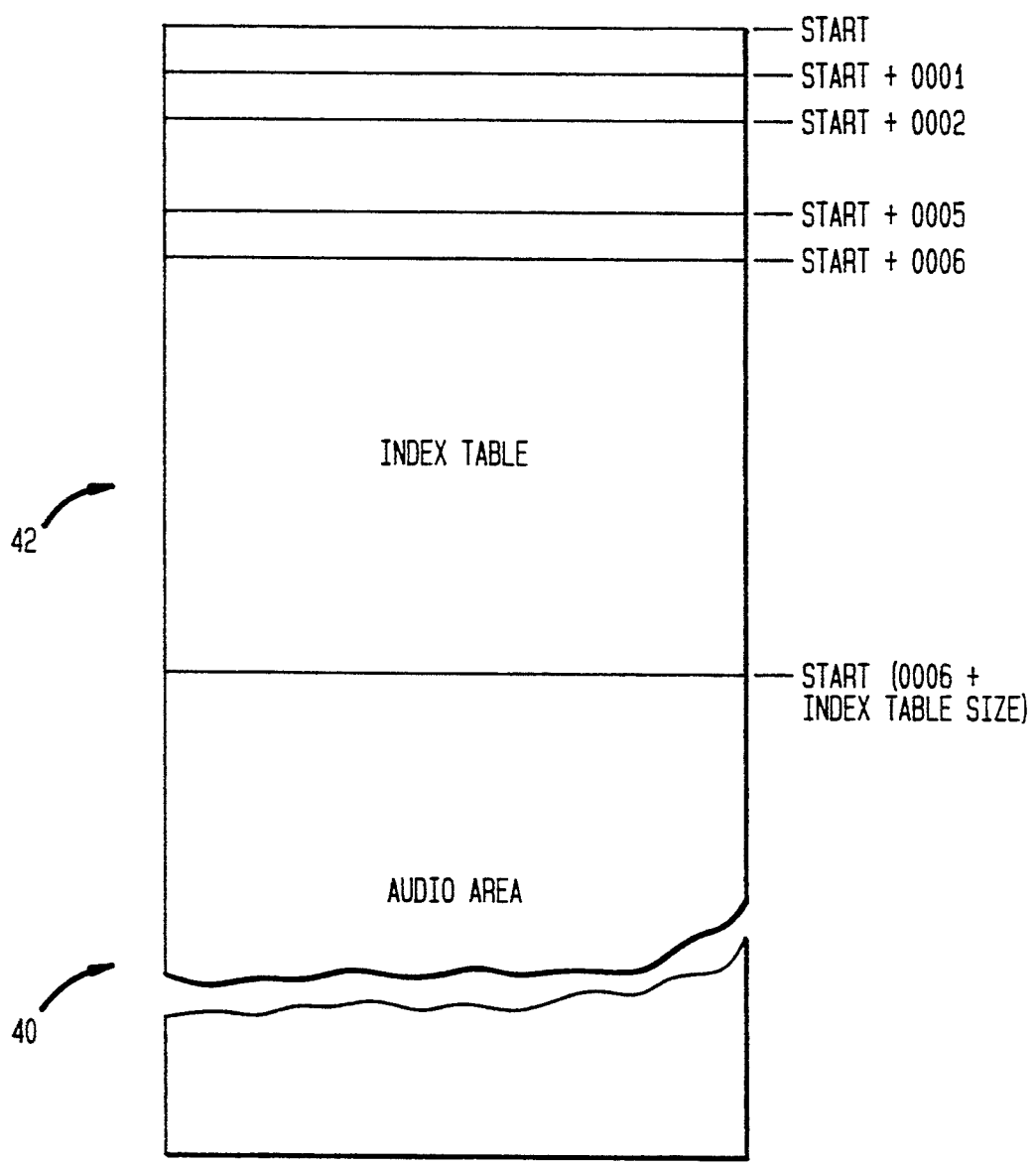
FIG. 2 is a schematic representation of the random access storage device shown in FIG. 1 illustrating the data sections thereof.

With reference now to FIG. 2, the random access storage device 23 is shown in schematic form and is composed of two portions, or partitions, a primary partition 40 and a secondary partition 42. The primary partition 40 is divided into physical locations identified by SCSI record numbers and representing dynamic time slots, with each time slot corresponding to 6 seconds of audio.

The term dynamic time is used to accent the fact that time represented by a time slot changes as audio is written. Data for a given time thereof will first be written into slot 1, and this process will progress until the last slot is filled. Thereafter, the sequence will start from the beginning again with the new data being written into slot 1 to for another given time replace the original data. The pointer 30 initially writes data into the top of the primary partition and continues writing data until the primary partition is full. Thereafter, the pointer 30 will again be located at the top of the primary partition and it will erase prior data while writing incoming data. It will be appreciated that an RAS memory can be of variable capacity so that it can be provided with more memory than the DAT, so as to be able to store more data than a DAT. Thus, an RAS device will store all the data storable in a tape thereby inhibiting the loss of data.

The secondary partition has two tables, a record session table 45 and an index table 46. The record session table 45 keeps track of the time when the logger 13 is recording and the index table 46 stores SCSI record numbers which is the location data in the primary partition 40.

With reference now to FIG. 3, a block diagram representation of the RAS device 23 is shown with the record session table 45, index table 46 and the primary partition 40 shown separately to enhance explanation of the recording and retrieving of data. The record session table 45 contains the start time, and end time columns of a recording session and columns for the location can be found in the index table for the beginning and end of message. In short, the record session table acts as a pointer for the index table 46. The index table 46 acts as a pointer for the primary partition and has a column of implied time slots, each representing 6.0 seconds, and a SCSI record number location column indicating where audio for a particular time slot is located on the primary partition 40. Although the time is shown only in terms of hours and minutes for convenience, it will be appreciated that the date will also be included.

With reference to FIG. 4, the audio is divided into a plurality of frames, each frame including a header and a plurality of audio blocks, as for example 5. Each frame will be allocated a period for recording, such as 6 seconds of time, as opposed to an amount of audio. The index table entry format is made up of a plurality of SCSI record numbers and determines the location of a frame within the primary partition 40 by assigning a SCSI record number to the same. It will be appreciated that even though a frame is allocated six seconds, the time of recording can be less or greater depending on the activity of the telephone and the number of telephones (channels) being monitored.

The RST entry format, as implemented in the record session table is made up of a start time, an end time, an index start entry, an index end entry and the recorded channels for the purpose of furnishing a selected frame or combination of the frames in the primary partition.

In operation, audio will be entered through the telephones 12, be received by the interface 14 and converted from analog to digital by the converter 16. Thereafter, the digital signals are received by the digital signal processor 18 that will compress the signals. These compressed signals will be received by the controller and the time of receipt will be correlated with the clock 19. What has been shown and described heretofore are known components of a digital logger system and will not be described in detail. The controller 20 sends the audio to the buffer 22 and the buffer 22 temporarily stores the audio. Thereafter, the buffer 22 transmits the data to a tape 26 that is housed in the DAT drive unit 24 and also transmits the data to a RAS device 23, the data being received simultaneously by these two units 23, 24.

The supervisor 21 can communicate with the controller 20 for the purpose of obtaining data from the RAS device 23. Upon input of the time and date of the data to be retrieved, the controller will locate the pointer 34 first at the appropriate location on the record session table 45 in the secondary partition to determine the location on the index table 46 of the SCSI record number. Upon such SCSI record number being located in the index table 46, the pointer 34 will seek such location to determine the SCSI record number where the sought after audio is found on the primary partition 40. The pointer 34 will go to such location so that the data can be played back through the speaker 17. The request for the retrieving of data has no affect on the pointer 30 which continues to transmit data to the RAS device first by supplying audio on the primary partition, then communicating with the secondary partition to write data for the tables 45, 46. Because of the separation of the primary partition into SCSI records, the voice data can be retrieved within 6 seconds of recording.

With reference now to FIG. 1, as the the first pointer 30 advances along the primary partition of the RAS device 23, it will continue to write data into the primary partition of RAS 23 until it reaches the last available memory slot. Thereafter, it will shift and start again at the beginning of the primary partition, replacing prior data with newly received audio, thus forming an endless loop. As stated previously, the pointer will shift from the primary partition to the secondary and back to refresh the data in the tables 45, 46 and record audio in the primary partition.

Thus what has been shown and described is an apparatus and method whereby audio can be retrieved from a digital audio logger while audio is still being recorded therein. This is accomplished by the use of a random access storage device that has two pointers, a first pointer for receiving data and the second pointer for retrieving data.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. In a method of storing and retrieving audio from a digital audio logger, the steps comprising:
monitoring an audio source,
storing audio data from the audio source in a buffer,
writing the audio data from the buffer onto a digital audio tape and a random access storage device, and
retrieving audio from the random access storage device while audio data is written into the digital audio tape and the random access storage device.

2. The method of claim 1 including the further steps of providing the random storage device with a primary partition and writing voice data onto the primary partition in time defined manner.

3. The method of claim 2 further including the further steps of providing the random access device with a secondary partition and writing an index table in the secondary partition to indicate location of audio data in the primary partition.

4. The method of claim 3 further including the step of providing the secondary partition with a record session table, storing start and end times of recording session, and index start and end entries of the index table to indicate location in the index table of selected audio.

5. In a system for processing audio having an interface for receiving audio from an audio source, a digital signal processor in communication with the interface for compressing the audio signals, a controller in communication with the digital signal processor for receiving audio therefrom and arranging data in a prescribed order, a supervisor in communication with said controller accessing data from said system, and a buffer in communication with the controller for receiving arranged audio from the controller, the improvement comprising:

a digital audio tape drive unit in communication with the buffer for receiving arranged audio data from the buffer, a random access storage device, and a pair of pointers providing communication between said buffer and random storage device, the first of said pointers operative for transmitting audio data to said random access storage device from said buffer and the second of said pointers being operative to send audio data from said random access storage device to said controller.

6. The system of claim 5 further including a speaker in communication with said controller for playing audio retrieved from said random access storage device.

7. The system of claim 6 wherein said random access storage device has a primary partition for storing recorded audio data and a secondary partition for storing means for locating selected audio data stored on said primary partition, said second pointer being alternately in communication with said first partition and said second partition.

8. An audio data storage device, comprising:

a random access storage device having a primary partition for storing audio data and a secondary partition for storing means for locating data on said primary partition and a pair of pointers in communication with said random access memory, a first of said pointers being operated to transmit data to said random access storage device and the second of said pointers being operative to retrieve audio data from said random access storage device.

* * * * *

(12) EX PARTE REEXAMINATION CERTIFICATE (6965th)
United States Patent
Henits et al.

(10) Number: US 5,396,371 C1
(45) Certificate Issued: Aug. 4, 2009

(54) ENDLESS LOOP VOICE DATA STORAGE AND RETRIEVABLE APPARATUS AND METHOD THEREOF

(75) Inventors: John Henits, Bethel, CT (US); Robert B. Swick, Stratford, CT (US); Constantine P. Messologitis, Milford, CT (US); Christopher S. Goane, Greenwich, CT (US)

(73) Assignee: Nice Systems, Inc., Rutherford, NJ (US)

Reexamination Request:
No. 90/008,948, Dec. 4, 2007

Reexamination Certificate for:
Patent No.: 5,396,371
Issued: Mar. 7, 1995
Appl. No.: 08/171,296
Filed: Dec. 21, 1993

(51) Int. Cl.
*G11B 27/031* (2006.01)
*G11B 27/032* (2006.01)
*G11B 27/32* (2006.01)
*G11B 27/10* (2006.01)
*G11B 20/10* (2006.01)

(52) U.S. Cl. .............................................. 360/5; 360/32
(58) Field of Classification Search ........................ None
See application file for complete search history.

(56) References Cited

U.S. PATENT DOCUMENTS

| | | |
|---|---|---|
| 4,051,355 A | 9/1977 | Lin |
| 4,121,058 A | 10/1978 | Jusko et al. |
| 4,221,933 A | 9/1980 | Cornell et al. |
| 4,260,854 A | 4/1981 | Kolodny et al. |
| 4,375,083 A | 2/1983 | Maxemchuk |
| 4,408,309 A | 10/1983 | Kiesling et al. |
| 4,412,098 A | 10/1983 | An |
| 4,523,055 A | 6/1985 | Hohl et al. |
| 4,549,047 A | 10/1985 | Brian et al. |
| 4,573,140 A | 2/1986 | Szeto |
| 4,805,217 A | 2/1989 | Morihiro et al. |
| 4,829,514 A | 5/1989 | Frimmel, Jr. et al. |
| 4,841,574 A | 6/1989 | Pham et al. |
| 4,864,543 A | 9/1989 | Ward et al. |
| 4,873,589 A | 10/1989 | Inazawa et al. |

(Continued)

FOREIGN PATENT DOCUMENTS

| | | |
|---|---|---|
| DE | 4015626 | 11/1990 |
| DE | 4024231 | 2/1991 |
| EP | 0321077 | 6/1989 |
| EP | 0372894 | 6/1990 |
| EP | 424116 | 4/1991 |
| EP | 0449213 | 10/1991 |
| EP | 490239 | 6/1992 |
| EP | 503480 | 9/1992 |
| GB | 2212359 | 7/1989 |
| JP | 62-020460 | 1/1987 |
| JP | 62192077 | 8/1987 |
| JP | 05325511 | 12/1993 |

OTHER PUBLICATIONS

Magnasync Corporation, "Product Information and Brochures for Digital Voice Logger," Jul. 1992.

(Continued)

*Primary Examiner*—Ryan R Yang

(57) ABSTRACT

Apparatus and method for storing and retrieving audio data simultaneously. A digital audio logger is provided with a digital audio tape (DAT) for permanent storage of audio data and with a random access storage (RAS) device that provides fast retrieval of audio. Both the DAT and RAS devices have audio written from a buffer that initially stores audio data temporarily. Two pointers are provided for the RAS device. Because of the randomness characteristic of the RAS device, data can be retrieved rapidly with a first one of the pointers and for this reason has advantages in fast retrieval. The RAS device communicates with a supervisor whereby data can be retrieved therefrom through the first pointer while the RAS device is receiving data from the buffer through the second pointer.

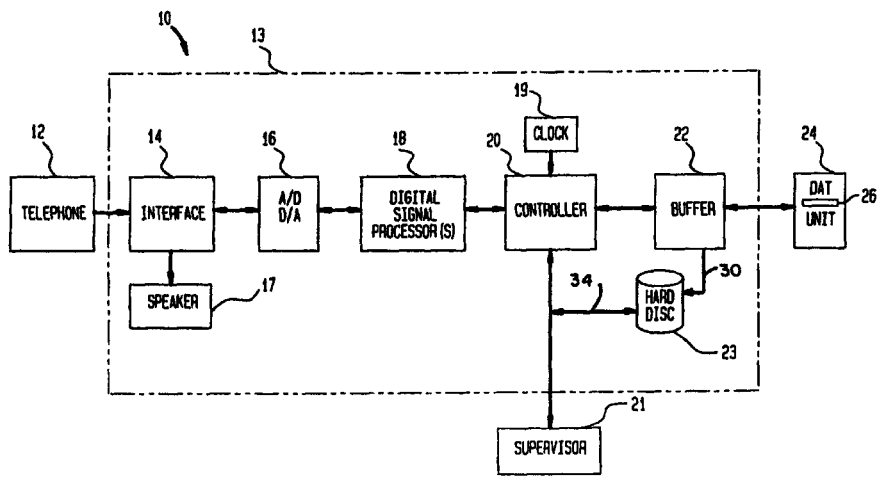

U.S. PATENT DOCUMENTS

| | | | |
|---|---|---|---|
| 4,891,835 | A | 1/1990 | Leung et al. |
| 4,905,141 | A | 2/1990 | Brenza |
| 4,963,866 | A | 10/1990 | Duncan |
| 4,985,914 | A | 1/1991 | Fukunaga et al. |
| 4,998,272 | A | 3/1991 | Hawkins, Jr. et al. |
| 5,012,459 | A | 4/1991 | Odaka et al. |
| 5,025,324 | A | 6/1991 | Hashimoto et al. |
| 5,031,218 | A | 7/1991 | Galand et al. |
| 5,142,527 | A | 8/1992 | Barbier et al. |
| 5,210,829 | A | 5/1993 | Bitner |
| 5,241,428 | A | 8/1993 | Goldwasser et al. |
| 5,343,452 | A | 8/1994 | Maeda et al. |
| 5,345,430 | A | 9/1994 | Moe |
| 5,359,468 | A | 10/1994 | Rhodes et al. |
| 5,371,551 | A | 12/1994 | Logan et al. |
| 5,406,425 | A | 4/1995 | Johnston et al. |
| 5,539,897 | A | 7/1996 | Samanta et al. |
| 5,564,033 | A | 10/1996 | Takekuma et al. |
| 5,581,606 | A | 12/1996 | Gineys et al. |
| 5,710,978 | A | 1/1998 | Swift |
| 5,819,005 | A | 10/1998 | Daly et al. |
| 5,946,445 | A | 8/1999 | Peters et al. |
| 5,974,015 | A | 10/1999 | Iizuka et al. |
| 6,208,476 | B1 | 3/2001 | Park et al. |

OTHER PUBLICATIONS

"Voice Logging: Comverse Reports Initial Success for Its New Digital Voice Logging System," Edge, vol. 7, No. 209, p. 18, Jul. 1992.

Press Release, Dictaphone Corporation, "Digital Audio Tape Logger—Another Dictaphone First," Feb. 1992.

Rumsey, Francis, "The Disk Drive as an Audio Recorder," Music and Sound Recording, The Institute of Sound Recording Papers, University of Surrey, May 1990.

Griffiths et al., "A Flexible Digital Sound–Editing Program for Minicomputer Systems," presented at the 68th Convention of the Audio Engineering Society in Hamburg, Germany, Journal of Audio Engineering Society, Mar. 1981.

Memory Space Allocation of Messages in Voice–Mail, IBM Technical Description Bulletin, Jul. 1987.

Bagnaschi, "A Magnetic Storage Disk Based Digital Audio Recording, Editing and Processing System", 83rd AES Corporation (Oct. 16–19, 1987).

Fukami, et al. "A New Play–Back Method for R–DAT Using Non–Tracking Signal Processing", IEEE Transactions on Consumer Electronics, vol. 37, No. 4, Nov. 1991, pp. 814–822.

N.F. Maxemchuk,"An Experimental Speech Storage and Editing Facility", The Bell System Technical Journal vol. 59, No. 8, Oct. 1980, pp. 1383–1395.

Tan, et al., "Digital Audio Tape For Data Storage", IEEE Spectrum Oct. 1989, pp. 34–38.

Expert Report on the Invalidity of U.S. Patent No. 5,396,371 in *Dictaphone Corporatione* vs. *Nice Systems, Ltd.*, dated Jan. 31, 2002, Civil Action 3:00CV1143.

Nice's Markman Brief in *Dictaphone Corporation* v. *Nice Systems, Ltd.*, dated Dec. 13, 2002, Civil Action 3:00CV1143.

"Operators Manual", Issue 1, Jun. 1992.

"Racals Rapidax Voice Logging Recorders Offers Instant Message Recall of Multichannel Calls, Transmissions".

"Rapidax in Surveillance and Security Monitoring".

"Rapidax Access Voice Logging Recorder".

"Rapidax Tape Archive and System Network".

"Rolm Introduces Digital PBX Line", Electronic News, v29, n1472 Nov. 21, 1983, pp. 60.

"Siemens Unveils The HCM 200—A Fully Digital, Voice/Data Hybrid", Teleconnect, v7, n11, Nov. 1989, pp. 35.

Wong, et al., "Signal Processing Software For A Voice Messaging System Using The TMS32010 Processor", 1983 IEEE Int. Conf. on Acoustics, Speech and Signal Processing, pp. 1417–1420.

"System Managers Manual", SM 138–002, Issue 1.

"Telephone Logging", Teleconnect, v8, n10 Oct. 1990, pp. 56.

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFFECTED BY AMENDMENT ARE PRINTED HEREIN

Column 1, lines 55–68:

A supervisor is in communication with the logger, and a data retrieving pointer is connected to the RAS device so that data can be retrieved from the RAS device while data is also being written thereto by a second pointer. The data retrieving pointer first goes to the header of the RAS device for determining the location of data stored at a particular time. After the [printer] *pointer* reads the location of data from the header, it will then contact the location at which the desired information is written. The recording will be played back so that the sought after information can be retrieved. As such retrieving is taking place, the second pointer allows the RAS device to continuously receive data at the same time as the DAT.

Column 2, lines 17–44:

With reference to FIG. 1, a digital audio logger system is shown generally at 10, in which the instant invention can be practiced. A plurality of audio sources 12, such as telephones, [are] *is* able to transmit audio to an interface 14 of a digital logger 13 which monitors the telephones. Although the invention will be described with the use of telephones 12, it will be appreciated the invention can be used with other sources of audio, such as police radios. The interface 14 is in communication with a speaker 17 and with an analog/digital (A/D), digital/analog (D/A) converter 16 that will convert analog signals received from the telephones 12 to digital signals when data is flowing in one direction and digital to analog signals when data flows in the opposite direction. A digital signal processor 18 is in communication with the converter 16 and performs the function of compressing the digital voice signals by use of a voice compressing algorithm as is known in the art. Any of a number of commercially [commercially] available signal processors can be used for the purpose, such as a Texas Instrument TMS 320C25 processor available from Texas Instruments Inc. The compressed data is received by a controller 20 that arranges the data in a prescribed order and controls the flow of the data. In with the controller 20, is a clock 19 that provides the time and [data] *date*, a buffer 22 that temporarily stores data, a random access storage device 23 and a supervisor 21 that provides access to the logger 13.

Column 2, lines 55–62:

With reference now to FIG. 2, the random access storage device 23 is shown in schematic form and is composed of two portions, or partitions, a primary partition 40 and a secondary partition 42. The primary partition 40 is divided into physical locations identified by SCSI record numbers [and] representing dynamic time slots, with each time slot corresponding to 6 seconds of audio.

AS A RESULT OF REEXAMINATION, IT HAS BEEN DETERMINED THAT:

The patentability of claims 5, 6 and 7 is confirmed.

Claim 1 is cancelled.

Claims 2 and 8 are determined to be patentable as amended.

Claims 3 and 4, dependent on an amended claim, are determined to be patentable.

New claims 9–36 are added and determined to be patentable.

2. [The] *In a* method of [claim 1 including the further steps of] *storing and retrieving audio from a digital audio logger, the steps comprising:*

*monitoring an audio source,*

*storing audio data from the audio source in a buffer,*

*writing the audio data from the buffer onto a digital audio tape and a random access storage device,*

*retrieving audio from the random access storage device while audio data is written into the digital audio tape and the random access storage device, and* providing the random storage device with a primary partition and writing [voice] *audio* data onto the primary partition in time defined manner.

8. An audio data storage device, comprising:

a random access storage device having a primary partition for storing audio data and a secondary partition for storing means for locating data on said primary partition and a pair of pointers in communication with said random access [memory] *storage device*, a first of said pointers being operated to transmit data to said random access storage device and the second of said pointers being operative to retrieve audio data from said random access storage device.

*9. The audio data storage device of claim 8, wherein said first of said pointers is operated to transmit audio data to said random access storage device.*

*10. The audio data storage device of claim 9, further comprising a buffer, wherein said random access storage device is in communication with said buffer.*

*11. The audio data storage device of claim 10, further comprising a controller in communication with said buffer.*

*12. The audio data storage device of claim 11, wherein said controller is operative to arrange data in a prescribed order and provide the arranged data to said buffer.*

*13. The audio data storage device of claim 12, wherein said first of said pointers is operative to transmit data to said random access storage device from said buffer.*

*14. The audio data storage device of claim 9, further comprising a digital signal processor, the digital signal processor compressing audio signals stored as audio data in said primary partition of said random access storage device.*

*15. The audio data storage device of claim 14, further comprising a buffer and a controller, said buffer being in communication with said random access storage device and said controller being in communication wiith said buffer.*

*16. The audio data storage device of claim 15, wherein said controller is operative to arrange data in a prescribed order.*

*17. The audio data storage device of claim 16, further comprising a buffer, wherein said first of said pointers is* operative to transmit data to said random access storage device from said buffer.

18. The audio data storage device of claim 9, further comprising an interface for receiving audio from an audio source, the audio being provided to said random access storage for storage therein as audio data.

19. The audio data storage device of claim 18, wherein said interface is in communication with a telephone.

20. The audio data storage device of claim 9, further comprising a buffer and a supervisor, said supervisor being operative to retrieve audio data from said random access storage through said second pointer while said random access storage device receives audio data from said buffer through said first pointer.

21. The audio data storage device of claim 9, wherein said second of said pointers is operative to retrieve audio data from said random access storage device as the audio data storage device continues to receive audio.

22. The method of claim 2, wherein the audio source comprises a plurality of telephones, and wherein said monitoring step comprises converting analog signals received from said telephones to digital signals.

23. The method of claim 22, wherein said monitoring step further comprises compressing the digital signals by use of a compressing algorithm.

24. The method of claim 2, further comprising a step of providing a pointer for communication from said buffer to said random storage device.

25. The method of claim 24, wherein said writing step further comprises transferring data to said random storage device that is temporarily stored in said buffer using said pointer.

26. The method of claim 24, wherein said step of providing said random storage device with said primary partition comprises the further step of dividing said primary partition into identified physical locations.

27. The method of claim 26, wherein said step of writing of audio data onto said primary partition in said time defined manner comprises writing the audio data to said identified physical locations.

28. The method of claim 27, wherein said step of writing audio data onto said primary partition in said time defined manner further comprises:

said pointer initially writing data into a top of said primary partition, said pointer continuing writing data until said primary partition is full, and thereafter locating said pointer at said top of said primary partition and erasing prior audio data while writing incoming audio data.

29. The method of claim 28, wherein said identified physical locations comprise records and wherein the method further comprises the step of dividing the audio data into a plurality of frames with each frame being written to a record.

30. The method of claim 29, including the additional step of assigning a record number to each of said frames to determine a location of each frame within said primary partition.

31. The method of claim 29, wherein each of said plurality of frames comprises a header and a plurality of audio blocks.

32. The method of claim 26, wherein said identified physical locations comprise records and wherein the method further comprises the step of dividing the audio data into a plurality of frames with each frame being written to a record.

33. The method of claim 32, wherein said step of writing of audio data onto said primary partition in said time defined manner comprises writing the audio data to said identified physical locations.

34. The method of claim 33, wherein said step of writing audio data onto said primary partition in said time defined manner further comprises:

said pointer initially writing data into a top of said primary partition, said pointer continuing writing data until said primary partition is full, and thereafter locating said pointer at said top of said primary partition and erasing prior audio data while writing incoming audio data.

35. The method of claim 32, including the additional step of assigning a record number to each of said frames to determine a location of each frame within said primary partition.

36. The method of claim 32, wherein each of said plurality of frames comprises a header and a plurality of audio blocks.

* * * * *